(12) United States Patent
Rathmell

(10) Patent No.: US 12,070,978 B1
(45) Date of Patent: Aug. 27, 2024

(54) JUMPSTART SYSTEM AND METHOD OF USE

(71) Applicant: Wade Rathmell, San Angelo, TX (US)

(72) Inventor: Wade Rathmell, San Angelo, TX (US)

( * ) Notice: Subject to any disclaimer, the term of this patent is extended or adjusted under 35 U.S.C. 154(b) by 226 days.

(21) Appl. No.: 16/528,870

(22) Filed: Aug. 1, 2019

(51) Int. Cl.
| | | |
|---|---|---|
| *B60D 1/64* | (2006.01) | |
| *F02N 11/14* | (2006.01) | |
| *H01M 50/543* | (2021.01) | |
| *H02J 1/10* | (2006.01) | |
| *H02J 7/34* | (2006.01) | |

(52) U.S. Cl.
CPC .............. *B60D 1/64* (2013.01); *F02N 11/14* (2013.01); *H01M 50/543* (2021.01); *H02J 1/122* (2020.01); *H02J 7/342* (2020.01)

(58) Field of Classification Search
CPC ........ B60D 1/64; F02N 11/14; H01M 50/543; H02J 7/342; H02J 1/122
USPC .................................. 320/104, 105
See application file for complete search history.

(56) References Cited

U.S. PATENT DOCUMENTS

| | | | | | |
|---|---|---|---|---|---|
| 3,700,834 | A * | 10/1972 | Schaefer | ................ | H02G 11/02 174/543 |
| 3,936,121 | A * | 2/1976 | Leinberger | ............. | H01R 11/24 320/DIG. 15 |
| 3,942,027 | A * | 3/1976 | Fima | ........................ | H02G 3/00 180/68.5 |
| 4,006,952 | A * | 2/1977 | Puckett | .................. | H02G 11/02 174/541 |
| 4,163,134 | A * | 7/1979 | Budrose | ................. | H01R 11/24 200/51.09 |
| 4,261,634 | A * | 4/1981 | Robinson | ............... | H01R 31/06 439/627 |
| 4,366,430 | A * | 12/1982 | Wright | ............. | G01R 19/16576 320/105 |
| 4,617,506 | A * | 10/1986 | Bogie | ................... | H02J 7/0048 320/105 |
| 4,721,479 | A * | 1/1988 | Shuman | ................. | H01R 11/24 439/503 |
| 4,885,524 | A * | 12/1989 | Wilburn | ............... | H01M 10/44 320/105 |
| 4,975,089 | A * | 12/1990 | Lee | ........................ | H01R 11/24 439/759 |
| 5,613,884 | A * | 3/1997 | Krivec | .................... | H01R 11/24 439/829 |
| 5,635,817 | A * | 6/1997 | Shiska | ................... | H02G 11/02 320/105 |
| 5,772,468 | A * | 6/1998 | Kowalski | ............... | H01R 11/24 439/822 |
| 6,638,101 | B1 * | 10/2003 | Botelho | ................ | H01R 11/24 439/829 |
| 6,679,708 | B1 * | 1/2004 | Depp | ................... | H01R 9/2466 361/752 |
| 7,351,119 | B2 * | 4/2008 | Mac Donald | ....... | H01M 50/256 439/759 |

(Continued)

*Primary Examiner* — M Baye Diao
(74) *Attorney, Agent, or Firm* — Richard G Eldredge; Leavitt Eldredge Law Firm

(57) ABSTRACT

A jumpstart system allows for the charging a battery or starting a car that has a dead battery without accessing the compartment where the battery is located. A connector is placed with access to the outside of the vehicle, preferably at the rear of the car. The connector accepts a jumper cable and places the dead battery in electric contact with a power source such as another car.

1 Claim, 3 Drawing Sheets

(56) References Cited

U.S. PATENT DOCUMENTS

| | | | | |
|---|---|---|---|---|
| 7,692,402 B2* | 4/2010 | Wise | | H02J 7/342 |
| | | | | 320/105 |
| 7,736,200 B2* | 6/2010 | Sproesser | | H01R 11/24 |
| | | | | 439/754 |
| 8,013,567 B2* | 9/2011 | Windsor | | H01M 10/46 |
| | | | | 320/104 |
| 8,172,603 B1* | 5/2012 | Richardet, Jr. | | H01R 11/24 |
| | | | | 439/759 |
| 8,376,775 B2* | 2/2013 | Rinehardt | | H01R 13/641 |
| | | | | 439/490 |
| 8,963,481 B2* | 2/2015 | Prosser | | B60L 53/00 |
| | | | | 320/105 |
| 9,401,608 B2* | 7/2016 | Chapple | | H02J 7/0042 |
| 9,484,760 B2* | 11/2016 | Pierson | | H02J 1/122 |
| 9,620,885 B2* | 4/2017 | Larkin | | H01R 13/447 |
| 9,630,514 B2* | 4/2017 | Ferrel | | B60L 53/24 |
| 9,963,038 B2* | 5/2018 | Parra Ortiz | | B60L 53/50 |
| 10,266,066 B2* | 4/2019 | Tsuji | | B60L 50/66 |
| 10,363,824 B1* | 7/2019 | Lumpkin | | H02J 7/0042 |
| 10,396,473 B2* | 8/2019 | Bellete | | H01R 13/11 |
| 10,454,191 B2* | 10/2019 | Porter | | H01R 11/24 |
| 10,777,919 B1* | 9/2020 | Olsson | | H01R 4/4863 |
| 2004/0239290 A1* | 12/2004 | Krieger | | H01M 50/20 |
| | | | | 320/105 |
| 2005/0070155 A1* | 3/2005 | Horenstein | | H01R 11/288 |
| | | | | 439/522 |
| 2006/0071631 A1* | 4/2006 | Cheung | | H02J 7/342 |
| | | | | 320/105 |
| 2006/0244412 A1* | 11/2006 | Bonzer | | H02J 7/00309 |
| | | | | 320/105 |
| 2012/0214042 A1* | 8/2012 | Wiegert | | H01M 50/543 |
| | | | | 429/121 |
| 2015/0349553 A1* | 12/2015 | Chapple | | H01R 11/24 |
| | | | | 320/105 |
| 2016/0121745 A1* | 5/2016 | Toepler | | B60L 53/16 |
| | | | | 320/105 |
| 2016/0308379 A1* | 10/2016 | Pan | | F02N 11/00 |
| 2019/0199017 A1* | 6/2019 | Stecewycz | | H02J 7/342 |

* cited by examiner

JUMPSTART SYSTEM AND METHOD OF USE

BACKGROUND

1. Field of the Invention

The present invention relates generally to vehicle electronics systems, and more specifically, to a jumpstart system for conveniently and safely transferring electricity from one vehicle to the battery of another car whose battery does not have sufficient charge to start that vehicle.

2. Description of Related Art

Vehicle electronics systems are well known in the art and are effective means to generate, store, distribute or otherwise utilize electricity within a mobile platform. For example, cars, trucks and the like, require an electric charge to start the engine. Commonly, a battery provides this electric charge. The battery is commonly recharged by an alternator or generator within the vehicle that is powered while the engine is active.

In the normal course of use, the battery will lose capacity and charge to the point where it will no longer provide the required electric charge to start the engine.

When the aforementioned battery can no longer provide the charge, it must receive electricity from an outside source. This is commonly accomplished with a set of jumper cables that connects the battery with a second battery in another vehicle and allows electricity to transfer between the two. This process is cumbersome and hazardous.

One of the problems commonly associated with vehicle electronics systems is its limited use. For example, access to the battery of the vehicle is limited to the length of the jumper cables. This requires the two vehicles to be parked with their batteries near each other. This is difficult when the immobile vehicle is in a parking spot with the battery away from the access road.

Additionally, access the battery commonly requires that the hood be opened. If the battery is completely drained of electricity and the vehicle is locked access the to hood is reduced if even possible. This requires a locksmith or other technician to service the vehicle to charge the battery adding cost and effort to the process.

Additionally, connecting a battery to another includes risks to the person connecting the two if they are not properly trained. The live battery is capable of discharging to the person or another part of the vehicle potentially damaging that part or injuring the person.

Lastly, improper care of the battery or defects in it could cause the battery to explode further putting people at risk of injury while working near the battery, particularly when attaching jumper cables.

Accordingly, although great strides have been made in the area of vehicle electronics systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
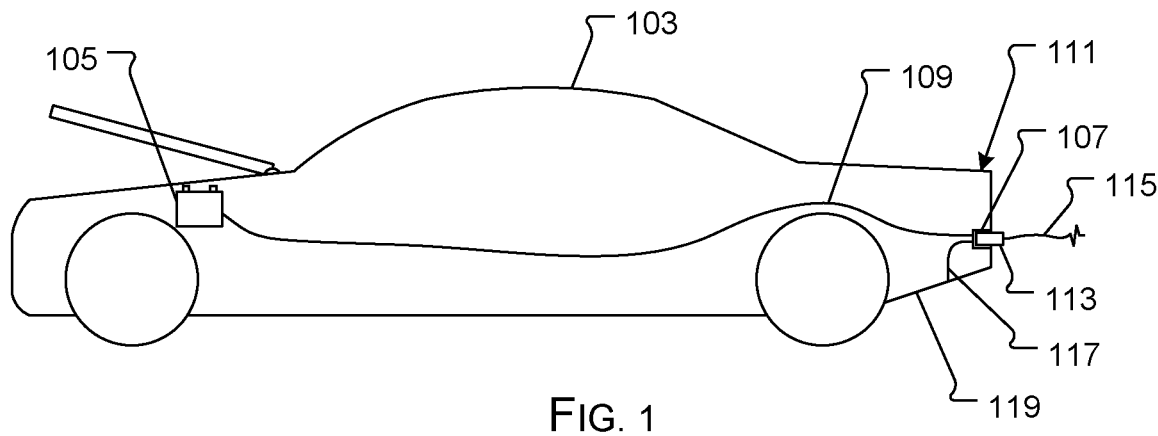
FIG. 1 is a side view of a jumpstart system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vehicle electronics systems. Specifically, the invention of the present application allows for electric access to the battery from the front and rear of a vehicle. In addition, the invention simplifies the connection of one battery to another reducing the chance for injury or damage. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a side view of a jumpstart system in accordance with a preferred embodiment of the present application. It will be appreciated that system 101 overcomes one or more of the above-listed problems commonly associated with conventional vehicle electronics systems.

In the contemplated embodiment, system 101 includes a vehicle 103 that includes a battery 105 in electronic communication with a connector 107 via wire 109, cable or the like. The connector 107 is attached to the vehicle 103 near the back end 111. The connector 107 is configured to accept a mating end 113 of a jumper cable 115. The system 101 also includes a ground 117 in electric communication with the connector 107 and the frame 119 of the vehicle.

Figure 2:
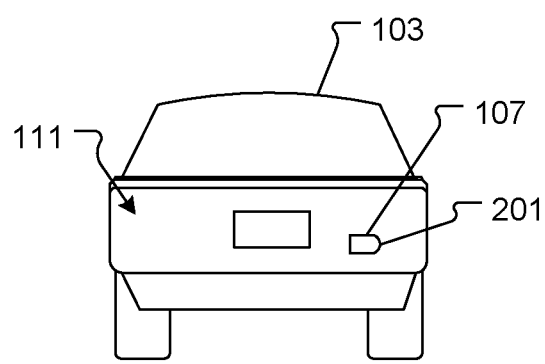
FIG. 2 is a back view of the system of FIG. 1.

It is contemplated that the connector 107 as depicted by FIG. 2 includes a key 201 to allow the mating end 113 of a jumper cable 115 to join thereto in only a single orientation.

In use, the mating end 113 of a jumper cable 115 is placed in electrical communication with the connector 107. Energy from a source attached to the jumper cable 115 flows through the connector 107 to the battery 105 sufficient to start the engine of the vehicle 103.

It should be appreciated that one of the unique features believed characteristic of the present application is that connector 107 is located away from the battery 105 to allow for access to jumpstart the vehicle without direct access to the battery.

Figure 3:
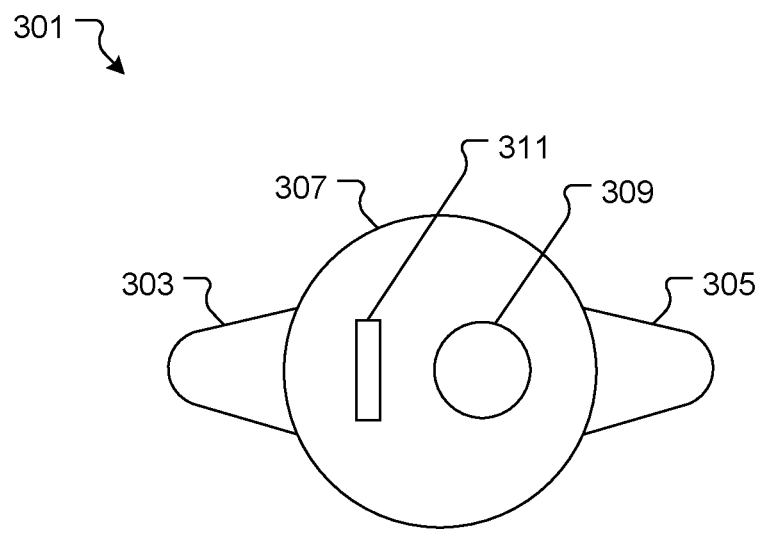
FIG. 3 is a front view of an alternative embodiment of the connector of FIG. 1.

In an alternative embodiment of the connector 107 as depicted by FIG. 3, the embodiment 301 includes a first keyway 303 and a second keyway 305 arrayed on either side of a receptacle 307. The receptacle 307 includes a positive pin 309 and a negative pin 311 of different configurations. It will be appreciated that the first keyway 303, second keyway 305 and the difference in the configuration of the pins precludes connecting a jumper cable 115 incorrectly. This reduces or eliminates the possibility of injury or damage while using the system 101 in any of its embodiments.

Figure 4:
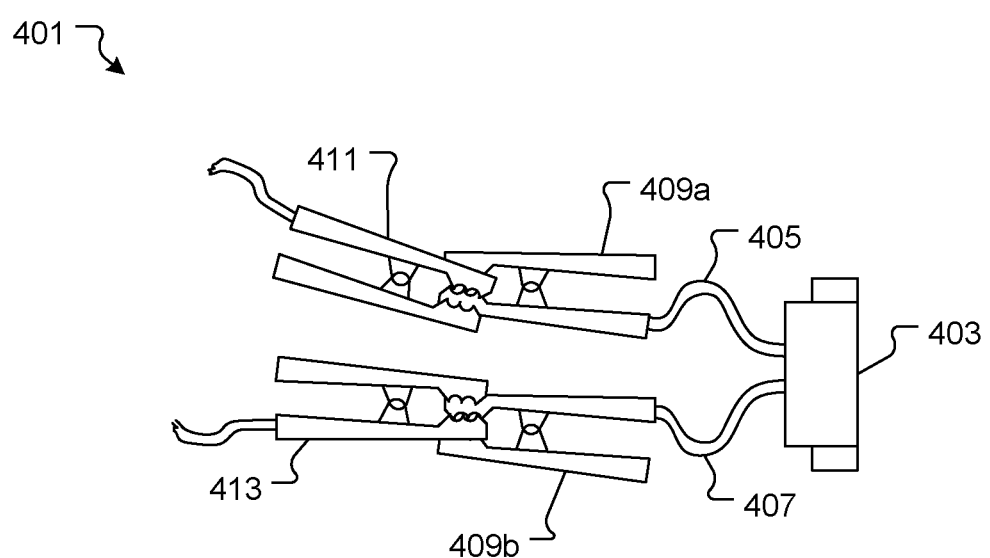
FIG. 4 is a side view of an alternative embodiment of the connector of FIG. 1.

Referring now to FIG. 4 an alternative embodiment of the jumper cable 115 attachment is depicted. Embodiment 401 includes a mating end 403 with a positive cable 405 and a negative cable 407 attached to their respective pins. Both the positive cable 405 and the negative cable 407 have a gripping jaw 409 attached to the far end of each respectively.

In use, a positive clamp 411 of a jumper cable 115 is attached to the gripping jaw 409 of the positive cable 405 and a negative clamp 413 of a jumper cable 115 is attached to the gripping jaw 409 of the negative cable 407. The mating end 403 is then attached to the connector 107 and the battery 105 is charged.

Figure 5:
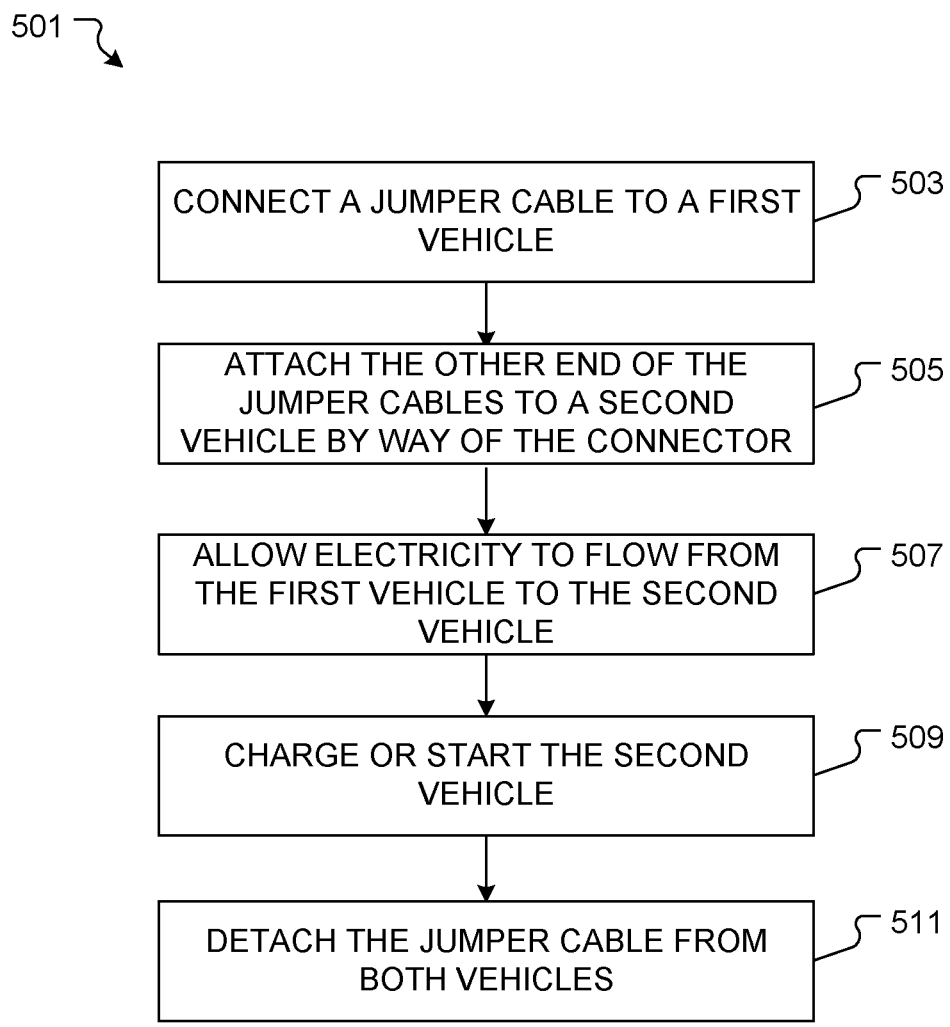
FIG. 5 is a flowchart of the preferred method of use of the system of FIG. 1.

Referring now to FIG. 5 the preferred method of use of the system 101 is depicted. Method 501 includes connecting a jumper cable to a first vehicle 503, attaching the other end of the jumper cables to a second vehicle by way of the connector 505, allowing electricity to flow from the first vehicle to the second vehicle 507, charging or starting the second vehicle 509 and detaching the jumper cable from both vehicles 511.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:
1. A jumpstart system comprising:
a first vehicle having:
a body with a front end and a back end;
an electrical connector positioned at the back end, the electrical connector having a positive clamp and a negative clamp, the positive clamp and the negative clamp extend in a direction away from the back end, the positive clamp and the negative clamp each have an electric cord that attaches to a gripping jaw;
a battery positioned at the front end and in electric communication with the positive clamp and the negative clamp via a wire, the wire extending from the front end where the battery is positioned to the back end where the positive clamp and the negative clamp are located;
wherein a second vehicle battery is charged by the battery of the first vehicle via the positive clamp and the negative clamp that engages with terminals of the second vehicle battery.

* * * * *